Nov. 27, 1962 J. N. DODGEN 3,065,808
PORTABLE FEED MEASURING AND MIXING APPARATUS
Filed Oct. 5, 1959
2 Sheets-Sheet 1
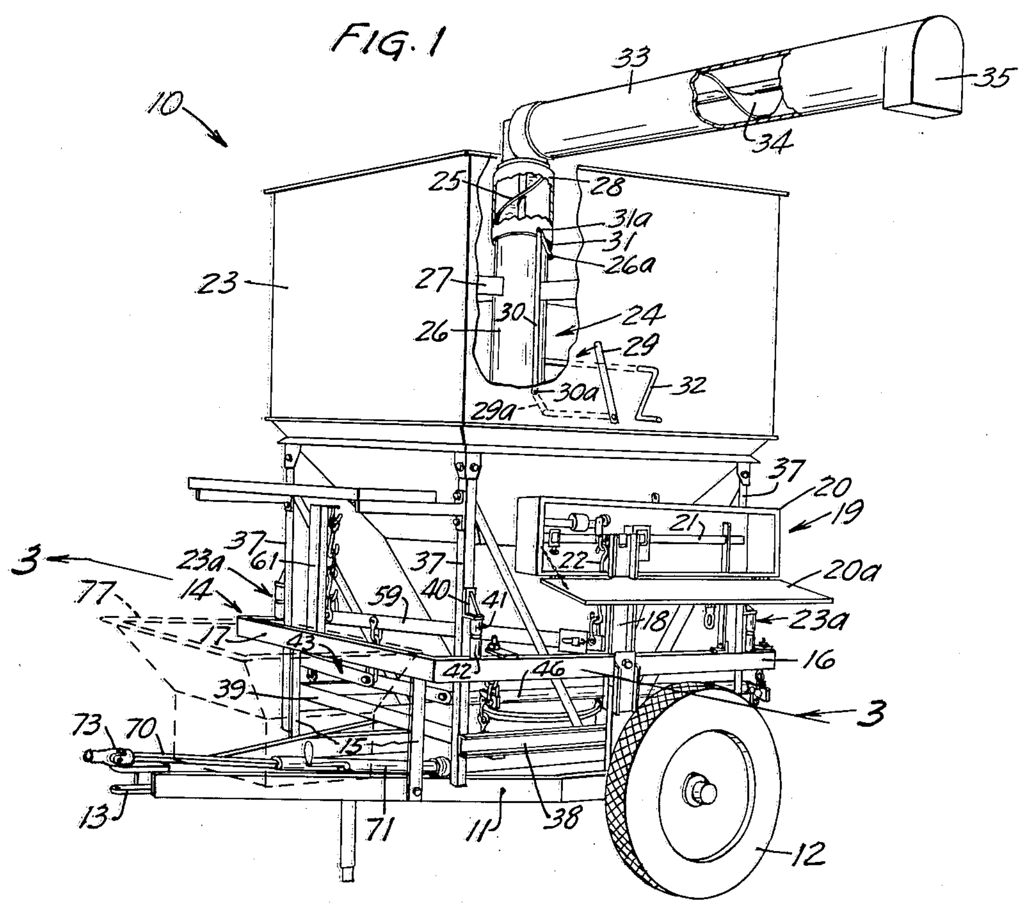
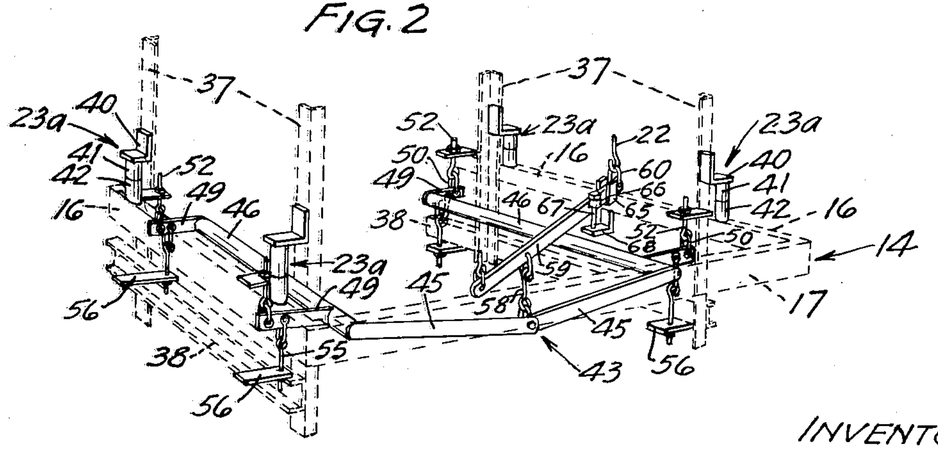
INVENTOR
JOHN N. DODGEN
BY
Williamson, Schroeder & Palmatier
ATTORNEYS

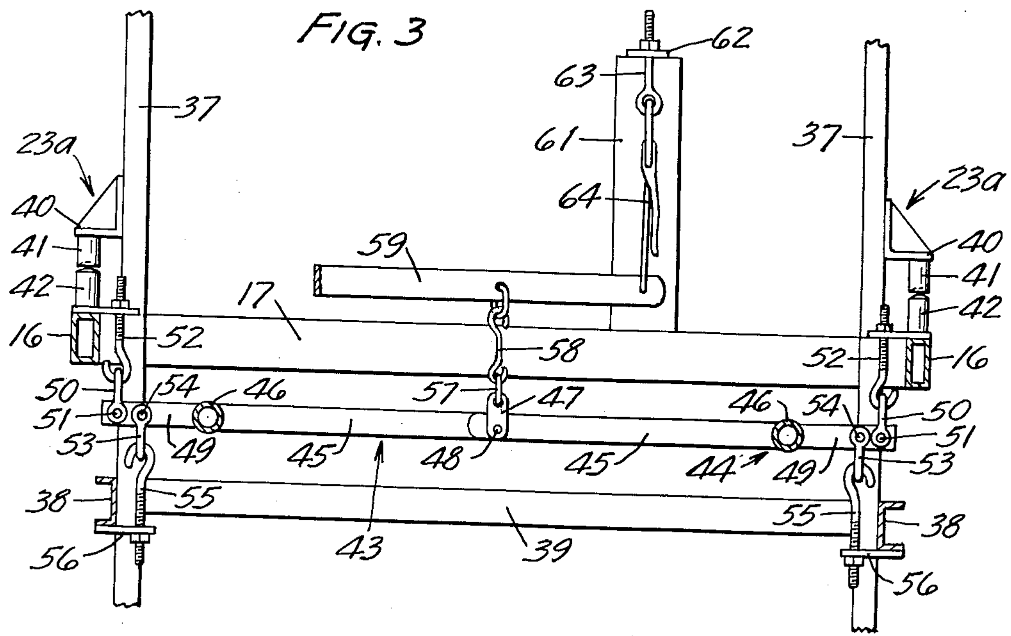
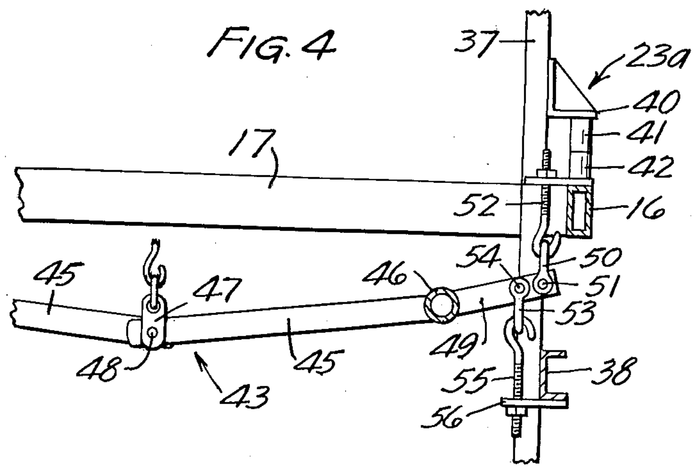
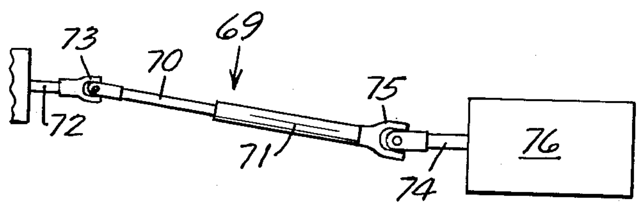
INVENTOR
JOHN N. DODGEN
BY *Williamson, Schroeder & Palmatier*
ATTORNEYS

United States Patent Office 3,065,808

Patented Nov. 27, 1962

3,065,808

PORTABLE FEED MEASURING AND MIXING APPARATUS

John N. Dodgen, Humboldt, Iowa

Filed Oct. 5, 1959, Ser. No. 844,436
6 Claims. (Cl. 177—151)

This invention relates to mobile material measuring and mixing apparatus of the type used for mixing and weighing granular material or the like.

An object of this invention is to provide a novel mobile material measuring apparatus, of simple and inexpensive construction, for use in readily weighing grain or the like.

Another object of this invention is to provide a novel material measuring apparatus including a hopper and a scale mechanism mounted on a chassis and means for interchangeably supporting the hopper from the chassis through the scale mechanism whereby the material within the hopper may be readily weighed.

A further object of this invention is to provide a novel mobile material measuring and mixing apparatus including a hopper and a scale mechanism each supported on a chassis and readily releasable means normally transmitting the weight of the hopper through the scale mechanism and releasable to permit the hopper to be supported directly on the chassis.

A still further object of this invention is to provide a novel mobile material measuring and mixing apparatus including a hopper type receptacle shiftable into weighing relation with a scale by an actuating lever mechanism arranged and constructed to gain a great mechanical advantage whereby the lever mechanism may be actuated manually for shifting of the hopper.

These and other objects and advantages of this invention will more fully appear from the following description made in connection with the accompanying drawings, wherein like reference characters refer to the same or similar parts throughout the several views, and in which:

FIG. 1 is a view in perspective of the novel material measuring and mixing apparatus with portions thereof broken away to better show the relationship of the concealed parts;

FIG. 2 is a diagrammatic view taken in perspective of the lever mechanism with portions of the supporting frame and hopper supporting mechanism shown in dotted line configuration;

FIG. 3 is an enlarged section taken on line 3—3 of FIG. 1 and looking in the direction of the arrows;

FIG. 4 is a view of the right hand portion of the mechanism shown in FIG. 3 but with certain of the parts shown in a different position; and FIG. 5 is an enlarged side elevational view of the novel drive shaft.

One embodiment of my novel weighing and mixing apparatus, generally designated as 10, is shown in the drawings and includes a mobile support or chassis 11 having a pair of ground traversing wheels 12, only one of which is shown. The chassis 11 is provided with a forwardly extending tongue 13 which is adapted for connection with a prime mover such as a tractor or truck.

Chassis 11 is provided with a supporting structure or frame 14 which includes four space upright members 15 each of which has its lower end secured to chassis 11. Frame 14 also includes a substantially rectangular shaped open framework which is secured to the upper ends of uprights 15 and includes a pair of opposed longitudinally extending member 16 and a pair of transversely extending members 17.

A vertical support 18 is secured to one of the longitudinally extending members 16, as seen in FIG. 1, and has a scale mechanism, generally designated 19, secured to the upper end thereof. Scale mechanism 19 is disposed within a housing 20 having a closure member or door *20a* hingedly connected thereto. Scale mechanism 19 is of the conventional type and includes a balance bar 21 to which is connected a connecting link 22, the function of which will be described hereinbelow.

An open top hopper 23, which is supported upon mobile chassis 11 by a hopper supporting mechanism or frame *23a*, includes a conveying and mixing mechanism 24 disposed therein. Conveying and mixing mechanism 24 is vertically disposed and centrally positioned within hopper 23 and includes an auger conveyor 25 disposed within a cylindrical conveyor tube 26 which is affixed to hopper 23 by support bars 27. Conveying and mixing mechanism 24, which forms no part of the present invention, serves to convey material through the bottom of the hopper into the interior thereof and is adjustable to permit the granular material to be mixed within the hopper and thereafter discharged outwardly therefrom.

Conveyor tube 26 has an upper telescoping section 28 slidably mounted thereon and means are provided for actuating section 28 into its adjusted positions. The actuating means include an actuating crank handle 29 which extends outwardly through the hopper wall and is provided at its inner end with an offset crank arm *29a* to which one end of an actuating link 30 is pivotally connected as at *30a*. Another link 31 has one end pivotally connected to the upper telescoping section 28 and the upper end of link 30 by a common pivot *31a* and link 31 has its other end pivotally conected to conveyor tube 26 at *26a*. Swinging movement of crank handle 29, of course, causes upward and downward telescoping movement of section 28 and a similar lower telescoping section, not shown in the drawing, is actuated in a similar manner by another actuating handle 32. It will be apparent that by sliding the upper telescoping section 28 downwardly permits grain conveyed through conveyor tube 26 to be discharged back into the hopper interior and if the lower telescoping member is raised, then a mixing action is effected.

The upper end of conveyor tube 26 is connected with a horizontal conveyor tube 33 in which is disposed an auger type conveyor 34 cooperating with vertically disposed auger 25. Horizontal conveyor tube 33 terminates at its outer free end in a downwardly facing discharge feed outlet 35 through which grain or the like is discharged. When upper telescoping member 28 is moved upwardly, then granular material or the like will be conveyed through conveyor tube 26 and thereafter through horizontal conveyor tube 33 to be discharged from feed outlet 35.

Hopper-supporting mechanism or frame *23a* is arranged to support the hopper directly upon a supporting structure 14 or for supporting the hopper from the supporting structure through the scale mechanism 19. Hopper supporting frame *23a* includes vertical legs 37 secured to and depending from the corners of hopper 23 and are positioned within the confines of the supporting structure 14. Legs 37 are connected adjacent their lower ends by horizontal side members 38 and a horizontally disposed end member 39 as seen in FIG. 1.

Referring now to FIG. 3, it will be seen that each of the vertical legs 37 is provided with a bracket 40 affixed to the intermediate portions thereof and extending laterally outwardly therefrom. Each bracket 40 is provided with a vertical post 41 secured thereto and depending therefrom and it will be noted in FIG. 3 that each of the vertical posts 41 has a concave lower end. Each of the longitudinally extending members 16 of supporting structure 14 is provided with an upstanding post 42 adjacent each end thereof and each of the posts 42 has its upper end of convex shape. It will be noted that each of the upstanding posts 42 are in substantially vertical alignment with depending post 41 and their respective ends are in abutting relation when the hopper is supported directly upon the supporting structure 14.

Means are provided for causing hopper 23 to be shifted from a position for support directly by supporting structure 14 into weighing relation with scale mechanism 19 and comprise a lever mechanism generally designated 43. Referring now to FIG. 2 wherein lever mechanism 43 has been diagrammatically illustrated with portions of the hopper supporting frame 33*a* and the supporting structure 14 shown in dotted line configuration, it will be seen that lever mechanism 43 includes a pair of L-shaped lever assemblies 44. Each of the lever assemblies 44 include a transverse lever arm 45 affixed to a longitudinally extending tubular member 46 in right angular relation. The respective inner ends of transverse lever arms 45 are pivotally connected to a small plate 47 by pivot pin 48. It will be seen that each of the elongated members 46 is provided with a pair of laterally extending lever arms 49 each of which is positioned at one end thereof.

Each of the laterally extending arms 49 is provided with an upwardly extending clevis link 50 pivotally secured thereto at 51 and which engages a downwardly extending hook 52 secured to longitudinally extending member 16 of supporting structure 14. Each lever arm 49 is also provided with a downwardly extending clevis link 53 pivotally secured thereto as at 54 and which is spaced inwardly of the upwardly extending clevis link 51. Downwardly extending clevis link 53 engages a hook element 55 which in turn is secured in upstanding relation to a bracket 56 attached to the lower end of each of the vertical legs 38. Thus it will be seen that by moving the end of transverse lever arm 45, which is pivotally connected to the small plate 47, in an upward direction the lever arm 49 will be caused to fulcrum about a point defined by the clevis link 50 and the downwardly extending hook 52 to thereby cause vertical translation of the hopper 23. Transverse lever arm 45 and laterally extending lever arm 49 define a lever of the second class for shifting the hopper in a vertical direction.

Referring now to FIG. 3, it will be seen that plate 47, which interconnects the respective inner ends of transverse lever arms 45, has a clevis link 57 secured thereto. A flexible link member 58 in the form of a chain is secured to clevis link 57 at one end thereof and is also connected to the intermediate portion of a horizontally disposed and diagonally extending actuating lever 59. It will be noted that actuating lever 59 has one end thereof positioned below scale mechanism 19 and a clevis link 60 is secured thereto for engagement with the connecting link 22. The other end of actuating lever 59 is positioned adjacent an upright member 61 which in turn is secured at one end thereof to transverse member 17 of supporting frame 14. Upright member 61 has a bracket plate 62 affixed to the upper end thereof to which is secured a vertically adjustable hook element 63. An over-the-center extensible chain type link 64 is secured to hook shaped element 63 and is also connected with a clevis link 65 carried by the end of actuating lever 59. Link 64 is extensible and retractable and retraction of the link causes corresponding upward movement of the end of actuating lever 59. This upward movement of the end of actuating lever 59 causes flexible link 58 to also move upwardly together with the pivotally connected ends of transverse lever arms 45. Each of the laterally extending arms 49 are then rocked about the pivotal connection between clevis link 50 and its corresponding hook element 52 and lever arm 49 acting through clevis link 53 and hook element 54 causes vertical translation of hopper 23.

Thus it will be seen that the entire weight of the hopper is transmitted from the supporting structure 14 by means of the lever assemblies 44 and through actuating lever 59 to the scale mechanism 19.

This permits the material disposed within the hopper to be measured which as a matter of practice is usually done prior to the mixing process. It will thus be seen that the resistance offered by the hopper structure 23 is ultimately transmitted through actuating lever 59 with the connection between link 64 and hook element 63 constituting the fulcrum thereof. The weights added to the end of balance bar 21 of scale mechanism 19, of course, constitute the effort needed to balance the resistance of the loaded hopper and it will be seen that the entire lever mechanism constitutes a plurality of levers of the second class.

When the hopper is moved to a position for direct support by the supporting structure 14, the extensible link 64 is extended and the lever mechanism assumes the position as shown in FIGS. 2 and 4. Posts 41 and 42 are then positioned in abutting relationshrip, as shown in FIG. 2, and the material within the hopper may then be mixed.

Tie down means are provided for retaining the actuating lever 59 against upward movement relative to the supporting structure 14 and include a bracket 66 secured to the end of actuating lever 59 adjacent the scale mechanism 19 as seen in FIG. 2. An elongated bolt 67 having its lower end threaded passes through bracket 66 and threadedly engages the bracket 68 secured to one of the longitudinally extending members 16 in support frame 14. The movement of actuating lever 59 is therefore prevented which is necessary when the measuring apparatus is being transported. The weight of the hopper, of course, also prevents displacement thereof when it is arranged in the transport position.

An elongated drive assembly, generally designated 69, provides drive means for rotating augers 25 and 34 and includes a pair of elongated telescoping sections 70 and 71 respectively. Drive shaft section 70 is connectible to the power take off shaft 72 of a prime mover such as a tractor by universal joint 73 and telescoping shaft section 71 is connected to a shaft 74 by universal joint 75. Shaft 74 is interconnected to auger 25 for drive thereof by a gear reduction box 76. When the hopper 23 is moved into weight transmitting relation with scale mechanism 19, telescoping sections 70 and 71 are arranged for axial movement to thereby permit the drive assembly 69 to remain in operating condition without the need of disconnecting various parts thereof.

Referring now to FIG. 1, a hammer mill 76, indicated by dotted line configuration, may be provided for preliminarily treating the granular material prior to the mixing and weighing operation.

It will be seen from the preceding paragraphs that I have provided a novel mobile mixing and measuring apparatus that is adjustable to permit material contained therein to be readily weighed. In preparing feed for stock, various ingredients are ordinarily mixed in certain proportions by weight. My novel apparatus not only permits the ingredients of such feed compounds to be accurately measured but also permits mixing the ingredients therein. The operations utilized by heretofore known structures was to first weigh the ingredients in one device and thereafter mix the ingredients in another device. It will therefore be seen that in the use of my novel measuring and mixing apparatus there is a great saving of time and labor.

It will also be seen that I have provided a novel mobile measuring apparatus which is arranged and constructed to permit a loaded hopper to be manually raised into weighing relation with a scale mechanism. It will be noted from the foregoing description that a great mechanical advantage is attained by my uniquely arranged lever mechanism for shifting the loaded hopper and it will also be noted that the drive assembly for the mixing mechanism is also arranged for shifting movement when the hopper is moved into weighing relation with the scale mechanism.

It will, of course, be understood that various changes may be made in the form, details, arrangement and proportions of the parts without departing from the scope of my invention which consists of the matter shown and described in the appended claims.

What is claimed is:

1. Mobile apparatus for weight measuring flowable material, comprising a mobile frame, a supporting structure thereon, a scale mechanism carried by the frame, a hopper structure, a plurality of bracket members rigidly carried by the hopper structure and each carrying a downwardly extending post, a plurality of upwardly extending posts carried by the supporting structure, said upwardly extending posts each being below and in vertical alignment with a downwardly extending post for engagement by and coaction with the latter in supporting the hopper on the supporting structure, lever mechanism interposed between the hopper structure and the scale mechanism and including a plurality of interconnected levers pivotally coupled to and supported on the frame and operatively coupled to the hopper for transmitting the weight of the hopper to the scale mechanism when the hopper is elevated to separate the aligned posts, one of said levers being pivotally coupled to and suspended at one end from the scale mechanism, suspension means coupling said one lever intermediate its ends with the other levers, and shiftable mechanism at the other end of said one lever forming an element of the pivotal coupling between said one lever and the supporting frame and said shiftable mechanism being operative for pivotally actuating said other levers to elevate the hopper from support by said upstanding posts for transmitting the weight of the hopper to the scale mechanism.

2. The invention according to claim 1, wherein the engagement of the aligned posts is an inter-fitting engagement formed by a convexity on an end of one post of a coacting pair and a concavity in the end of the other one of the pair into which the convexity is seated when the hopper is supported on the upstanding posts.

3. The invention according to claim 1, with tie down means for securing the said one end of said one of the levers to the frame when the hopper is in supported position on said upstanding posts.

4. Mobile apparatus for weight measuring flowable material, comprising a mobile frame, a supporting structure thereon, a scale mechanism secured to and supported by the mobile frame, a hopper structure, relatively movable means interconnecting the hopper structure with the supporting structure for support of the hopper structure thereby, lever mechanism interposed between the hopper structure and the scale mechanism for shifting the hopper structure and said relatively movable means from a position of hopper structure support directly on said frame to a weighing position whereby the weight of the hopper structure is transmitted through the lever mechanism to the scale mechanism, said lever mechanism including a plurality of interconnected levers arranged to fulcrum about predetermined points on the frame to thereby gain a mechanical advantage when shifting the hopper structure into weighing position, one of said levers comprising a substantially horizontally disposed actuating lever having an operative connection between one end thereof and said scale mechanism and having an operative coupling intermediate its ends with the other said levers whereby shifting of the latter may be effected, and a manually extensible and retractable link interconnected between the other end of said actuating lever and the fulcrum point therefor on the frame and being retractable for shifting said weight transmitting lever mechanism into weight transmitting position.

5. Apparatus for measuring material by weight comprising a base structure, a substantially horizontal supporting frame thereon, a hopper, mechanism for supporting the hopper above and relative to the frame, said mechanism including a plurality of elongate vertical supports attached to and extending from the hopper downwardly through the frame and cooperating, vertically aligned pairs of members between the frame and the vertical supports, one member of each pair being secured to a vertical support and the other member of the pair being carried on the frame, a scale mechanism supported by said base structure, a lever mechanism for elevating the hopper relative to said frame and for transmitting the weight of the elevated hopper to the scale mechanism, said lever mechanism comprising a first pair of relatively long lever arms disposed in spaced parallel relation and each being positioned adjacent to and transversely of two vertical supports and a second pair of relatively long lever arms each joined to and extending from one lever arm of the first pair toward the opposite arm of the first pair, the second pair of lever arms having pivotally connected inner ends, a short lever arm carried by each arm of the said first pair and extending outwardly therefrom in the opposite direction from the adjacent arm of the said second pair, suspension linkage coupling each short lever arm with the supporting frame and with a vertical support whereby vertical movement of the pivotally connected ends of the second pair of arms effects vertical movement of the hopper, an actuating lever disposed at an elevation above said lever mechanism, flexible means coupling one end of the actuating lever with the scale mechanism, flexible means depending from the actuating lever intermediate its ends and connected to the pivotally connected ends of the second pair of levers, and an extensible means coupling the other end of the actuating lever with the supporting frame for elevating and lowering the actuating lever and correspondingly elevating and lowering the said pivotally connected ends of said second pair of arms.

6. The invention according to claim 5, wherein said extensible coupling means is in the form of an over-the-center extensible chain type linkage.

References Cited in the file of this patent

UNITED STATES PATENTS

| | | |
|---|---|---|
| 1,172,185 | Whitlock | Feb. 15, 1916 |
| 1,322,710 | Malensheck | Nov. 25, 1919 |
| 2,885,191 | Hansen | May 5, 1959 |